(12) United States Patent
Preciado et al.

(10) Patent No.: US 12,250,099 B2
(45) Date of Patent: Mar. 11, 2025

(54) EXTERNAL ACTIVATION OF QUIESCENT DEVICE

(71) Applicant: PassiveLogic, Inc., Salt Lake City, UT (US)

(72) Inventors: Marciano Preciado, Salt Lake City, UT (US); Sterling Thomas Sleight, Murray, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 0 days.

(21) Appl. No.: 17/469,671

(22) Filed: Sep. 8, 2021

(65) Prior Publication Data

US 2023/0071312 A1 Mar. 9, 2023

(51) Int. Cl.
*H04L 15/24* (2006.01)
*H04L 9/32* (2006.01)
*H04L 12/12* (2006.01)

(52) U.S. Cl.
CPC ............ *H04L 15/24* (2013.01); *H04L 9/3234* (2013.01); *H04L 12/12* (2013.01)

(58) Field of Classification Search
CPC ........ H04L 15/14; H04L 9/3234; H04L 12/12
See application file for complete search history.

(56) References Cited

U.S. PATENT DOCUMENTS

| 3,021,516 | A | * | 2/1962 | Spitz | ........................ G01S 1/02 178/79 |
| 3,037,566 | A | * | 6/1962 | Pasco | ...................... H04L 15/08 178/82 R |
| 3,668,684 | A | * | 6/1972 | Johnson | ................. H04B 10/00 341/173 |
| 4,316,276 | A | * | 2/1982 | Koehler | ............... G04G 9/0064 968/936 |
| 4,651,158 | A | * | 3/1987 | Nelson | .................. G01S 13/788 342/47 |
| 5,220,681 | A | * | 6/1993 | Belgin | ..................... H04B 1/16 340/7.57 |

(Continued)

FOREIGN PATENT DOCUMENTS

| CA | 3125718 | C | * | 10/2023 | ............. G01S 17/10 |
| CN | 1219239 | A | * | 6/1999 | ........... C12N 9/0069 |

(Continued)

OTHER PUBLICATIONS

J. Holleman, A. Mishra, C. Diorio and B. Otis, "A micro-power neural spike detector and feature extractor in .13μm CMOS," 2008 IEEE Custom Integrated Circuits Conference, San Jose, CA, USA, 2008, pp. 333-336, doi: 10.1109/CICC.2008.4672089. (Year: 2008).*

(Continued)

*Primary Examiner* — Berhanu Tadese

(57) ABSTRACT

After installation, a device may be not yet powered. It may be awakened by receiving a flash of light of sufficient frequency and amplitude. After waking, the device decodes the message to determine its next action, and, upon request sends an authentication message. This enables a single user action to wake the device up and set it up with networking credentials. The same process may be used to wake the device outside of a normal sleep-wake cycle.

20 Claims, 6 Drawing Sheets

(56) References Cited

U.S. PATENT DOCUMENTS

| | | | | |
|---|---|---|---|---|
| 5,787,133 | A * | 7/1998 | Marchetto | H04L 1/0057 |
| | | | | 714/775 |
| 5,835,458 | A * | 11/1998 | Bischel | G11B 7/1353 |
| | | | | 369/44.29 |
| 5,959,537 | A * | 9/1999 | Banting | H02H 3/04 |
| | | | | 340/661 |
| 6,289,207 | B1 * | 9/2001 | Hudecek | G06F 3/0227 |
| | | | | 455/150.1 |
| 6,571,343 | B1 * | 5/2003 | Johnson | G06F 1/28 |
| | | | | 713/340 |
| 6,686,731 | B2 * | 2/2004 | Tacconi | G01R 35/04 |
| | | | | 324/74 |
| 7,257,053 | B2 * | 8/2007 | Fujiune | G11B 7/08511 |
| 7,418,620 | B1 * | 8/2008 | Tormasov | G06F 11/1076 |
| | | | | 714/6.24 |
| 7,786,907 | B2 * | 8/2010 | Monro | H03M 7/30 |
| | | | | 341/107 |
| 7,791,513 | B2 * | 9/2010 | Monro | H03M 7/4006 |
| | | | | 341/107 |
| 7,864,086 | B2 * | 1/2011 | Monro | H03M 7/4006 |
| | | | | 382/247 |
| 7,917,232 | B2 | 3/2011 | McCoy et al. | |
| 7,944,652 | B2 * | 5/2011 | Fukumoto | H05B 41/3927 |
| | | | | 315/276 |
| 8,024,054 | B2 | 9/2011 | Mairs et al. | |
| 8,067,894 | B2 * | 11/2011 | Katsu | G09G 3/3413 |
| | | | | 315/149 |
| 8,099,178 | B2 | 1/2012 | Mairs et al. | |
| 8,327,048 | B2 * | 12/2012 | Mao | G06F 3/00 |
| | | | | 710/69 |
| 8,352,652 | B2 * | 1/2013 | Mao | G06F 3/038 |
| | | | | 710/69 |
| 8,429,436 | B2 * | 4/2013 | Fillingim | G06F 11/3034 |
| | | | | 713/320 |
| 8,503,943 | B2 * | 8/2013 | Spanhake | H04Q 9/00 |
| | | | | 455/67.11 |
| 8,604,746 | B2 * | 12/2013 | Lee | H02J 3/381 |
| | | | | 320/101 |
| 8,629,790 | B2 * | 1/2014 | Oh | G06F 3/0233 |
| | | | | 345/169 |
| 8,738,908 | B2 | 5/2014 | Lee | |
| 8,782,619 | B2 * | 7/2014 | Wu | G06F 8/434 |
| | | | | 717/136 |
| 8,848,757 | B2 * | 9/2014 | Joseph | H01S 5/423 |
| | | | | 372/50.12 |
| 8,925,358 | B2 * | 1/2015 | Kasper | G05D 23/19 |
| | | | | 717/121 |
| 9,037,307 | B2 * | 5/2015 | Kaji | H02J 3/003 |
| | | | | 700/291 |
| 9,049,582 | B1 * | 6/2015 | Hassan | H04W 52/0261 |
| 9,265,425 | B2 * | 2/2016 | Ando | A61B 5/0068 |
| 9,280,748 | B2 * | 3/2016 | Nugent | G06N 5/02 |
| 9,383,447 | B2 * | 7/2016 | Schmitt | G01S 17/95 |
| 9,456,776 | B2 * | 10/2016 | Ando | A61N 5/0622 |
| 9,589,238 | B2 * | 3/2017 | Nugent | G06N 5/047 |
| 9,743,837 | B2 * | 8/2017 | Ando | A61B 5/0068 |
| 9,843,229 | B2 * | 12/2017 | Leabman | H02J 50/402 |
| 9,847,669 | B2 * | 12/2017 | Leabman | H02J 50/20 |
| 9,857,238 | B2 | 1/2018 | Malhotra et al. | |
| 9,860,961 | B2 | 1/2018 | Chemel et al. | |
| 9,953,260 | B1 * | 4/2018 | Nugent | G06N 5/047 |
| 10,089,516 | B2 * | 10/2018 | Popovich | G02B 6/0026 |
| 10,094,586 | B2 * | 10/2018 | Pavlovski | G05D 23/1917 |
| 10,135,295 | B2 * | 11/2018 | Leabman | H02J 50/20 |
| 10,199,849 | B1 * | 2/2019 | Bell | H04W 4/80 |
| 10,216,061 | B2 * | 2/2019 | Popovich | H01L 27/14625 |
| 10,333,305 | B2 * | 6/2019 | Imai | G06Q 50/06 |
| 10,386,544 | B2 * | 8/2019 | Yuan | G06N 7/01 |
| 10,388,085 | B2 * | 8/2019 | Harish | G01P 13/00 |
| 10,423,813 | B2 * | 9/2019 | Popovich | G06V 40/1324 |
| 10,459,311 | B2 * | 10/2019 | Popovich | G02F 1/13342 |
| 10,650,336 | B2 * | 5/2020 | Kopp | G06F 1/26 |
| 10,775,824 | B2 * | 9/2020 | Main | H02J 3/14 |
| 10,782,782 | B1 * | 9/2020 | DeSalvo | G06F 3/016 |
| 10,811,544 | B2 * | 10/2020 | Ota | H01L 31/02027 |
| 10,892,946 | B2 * | 1/2021 | Correia e Costa | H04W 48/18 |
| 10,918,872 | B2 * | 2/2021 | Parker | A61B 5/24 |
| 10,942,871 | B2 * | 3/2021 | Cawse | G08C 17/02 |
| 10,943,444 | B2 * | 3/2021 | Boyd | G08B 29/26 |
| 10,966,068 | B2 * | 3/2021 | Tramiel | H04W 24/10 |
| 10,976,173 | B2 * | 4/2021 | Harish | G07C 5/02 |
| 11,073,697 | B1 * | 7/2021 | Sharma | B05D 3/108 |
| 11,088,989 | B2 * | 8/2021 | Gao | H04L 67/51 |
| 11,237,556 | B2 * | 2/2022 | Nugent | G06N 3/063 |
| 11,309,440 | B2 * | 4/2022 | Ota | H04N 23/749 |
| 11,448,937 | B2 * | 9/2022 | Brown | G02B 5/1814 |
| 11,469,835 | B2 * | 10/2022 | Kim | H04W 76/27 |
| 11,598,862 | B2 * | 3/2023 | Henderson | G01S 7/4863 |
| 11,726,184 | B2 * | 8/2023 | Ferreira | G01S 17/86 |
| | | | | 356/4.01 |
| 11,743,764 | B2 * | 8/2023 | Lee | H04W 74/0808 |
| 2006/0056363 | A1 * | 3/2006 | Ratiu | G01D 21/00 |
| | | | | 370/254 |
| 2006/0103545 | A1 * | 5/2006 | Tsou | G08C 17/02 |
| | | | | 398/106 |
| 2006/0233485 | A1 * | 10/2006 | Allen | G01M 5/0066 |
| | | | | 385/13 |
| 2007/0112273 | A1 * | 5/2007 | Rogers | G01N 21/359 |
| | | | | 600/475 |
| 2007/0258337 | A1 * | 11/2007 | Fujiune | G11B 7/08511 |
| 2008/0296979 | A1 * | 12/2008 | Kato | H02J 50/10 |
| | | | | 307/104 |
| 2009/0135753 | A1 | 5/2009 | Veillette | |
| 2009/0167195 | A1 * | 7/2009 | Katsu | H05B 45/24 |
| | | | | 315/158 |
| 2009/0217063 | A1 * | 8/2009 | Tomita | G06F 1/3203 |
| | | | | 713/310 |
| 2009/0273738 | A1 * | 11/2009 | Fukumoto | H05B 41/2828 |
| | | | | 315/276 |
| 2010/0134285 | A1 * | 6/2010 | Holmquist | G08B 31/00 |
| | | | | 340/541 |
| 2010/0269383 | A1 * | 10/2010 | Nifenecker | H05B 45/325 |
| | | | | 40/541 |
| 2012/0066439 | A1 * | 3/2012 | Fillingim | G06F 3/0653 |
| | | | | 711/E12.008 |
| 2013/0232361 | A1 * | 9/2013 | Nishii | G06F 1/3212 |
| | | | | 713/323 |
| 2014/0143566 | A1 * | 5/2014 | Asano | G06F 1/3212 |
| | | | | 713/320 |
| 2014/0215446 | A1 * | 7/2014 | Araya | G06F 8/456 |
| | | | | 717/137 |
| 2014/0304542 | A1 * | 10/2014 | Rogers | G06F 1/30 |
| | | | | 713/340 |
| 2015/0077737 | A1 * | 3/2015 | Belinsky | G01N 15/0211 |
| | | | | 250/208.2 |
| 2015/0121684 | A1 * | 5/2015 | Kuutti | A62B 9/00 |
| | | | | 29/592.1 |
| 2015/0185819 | A1 * | 7/2015 | Saito | G16H 40/63 |
| | | | | 713/323 |
| 2015/0198938 | A1 * | 7/2015 | Steele | B25J 9/1689 |
| | | | | 700/275 |
| 2016/0020854 | A1 * | 1/2016 | Engel | H04B 10/116 |
| | | | | 398/118 |
| 2016/0062753 | A1 * | 3/2016 | Champagne | G06F 8/51 |
| | | | | 717/137 |
| 2016/0086191 | A1 | 3/2016 | Fonzi et al. | |
| 2016/0092427 | A1 * | 3/2016 | Bittmann | G06F 16/35 |
| | | | | 704/9 |
| 2016/0124495 | A1 * | 5/2016 | Kim | G06F 1/3228 |
| | | | | 713/323 |
| 2016/0203382 | A1 * | 7/2016 | Gardiner | H03M 7/3062 |
| | | | | 382/190 |
| 2016/0248251 | A1 * | 8/2016 | Tinnakornsrisuphap | H02J 13/00 |
| 2017/0049407 | A1 * | 2/2017 | Ando | A61N 5/0622 |
| 2017/0217390 | A1 | 8/2017 | Curtis et al. | |
| 2017/0299210 | A1 * | 10/2017 | Nyamjav | F24F 11/46 |
| 2017/0342920 | A1 | 11/2017 | Pirjaberi et al. | |
| 2018/0132340 | A1 * | 5/2018 | Correa | B60Q 1/085 |
| 2018/0224819 | A1 * | 8/2018 | Noboa | G05B 19/0423 |

(56) References Cited

U.S. PATENT DOCUMENTS

| | | | | |
|---|---|---|---|---|
| 2018/0375720 | A1* | 12/2018 | Yang | H04L 41/084 |
| 2019/0020197 | A1* | 1/2019 | Ahn | H02J 7/35 |
| 2019/0074990 | A1* | 3/2019 | Reimer | G08B 29/185 |
| 2019/0147154 | A1* | 5/2019 | Das | G06Q 30/0185 726/21 |
| 2019/0156443 | A1* | 5/2019 | Hall | G06Q 30/0283 |
| 2019/0190308 | A1* | 6/2019 | Miyoshi | H02S 50/00 |
| 2019/0220077 | A1* | 7/2019 | Tuan | H02J 13/00 |
| 2019/0258251 | A1* | 8/2019 | Ditty | B60W 50/023 |
| 2019/0357096 | A1* | 11/2019 | Warashina | H04W 36/08 |
| 2019/0364502 | A1* | 11/2019 | Agerstam | H04W 4/38 |
| 2019/0393969 | A1* | 12/2019 | Kim | H04B 17/318 |
| 2019/0394776 | A1* | 12/2019 | Lee | H04W 16/14 |
| 2020/0120202 | A1* | 4/2020 | Jakobsson | H04L 63/105 |
| 2020/0284883 | A1* | 9/2020 | Ferreira | G01S 17/10 |
| 2020/0326563 | A1* | 10/2020 | Suess | G01S 17/89 |
| 2021/0157312 | A1* | 5/2021 | Cella | G01M 13/045 |
| 2021/0298363 | A1* | 9/2021 | Daugherty | A24F 40/65 |
| 2021/0334187 | A1* | 10/2021 | Sewani | G06F 21/81 |
| 2022/0036724 | A1* | 2/2022 | Gupta | G08B 26/008 |
| 2022/0066528 | A1* | 3/2022 | Harvey | H04L 67/12 |
| 2022/0095084 | A1 | 3/2022 | Evans et al. | |
| 2022/0110181 | A1* | 4/2022 | Miao | H04L 1/1822 |
| 2022/0117314 | A1* | 4/2022 | Daugherty | G06F 1/3287 |
| 2022/0187847 | A1* | 6/2022 | Cella | G06Q 10/08 |
| 2022/0193915 | A1* | 6/2022 | Marinkovich | B29C 64/393 |
| 2022/0196889 | A1* | 6/2022 | Marinkovich | G02B 26/00 |
| 2022/0197246 | A1* | 6/2022 | Cella | G06Q 10/06311 |
| 2022/0197247 | A1* | 6/2022 | Cella | G06N 20/20 |
| 2022/0197306 | A1* | 6/2022 | Cella | G06N 3/006 |
| 2022/0245574 | A1* | 8/2022 | Cella | G06F 9/451 |
| 2022/0271809 | A1* | 8/2022 | Raghavan | H04B 7/063 |
| 2022/0305735 | A1* | 9/2022 | Cella | G02B 26/00 |
| 2022/0318707 | A1* | 10/2022 | Cella | G06N 20/00 |
| 2023/0007724 | A1* | 1/2023 | Li | H04W 76/28 |
| 2023/0071312 | A1* | 3/2023 | Preciado | H04L 9/3234 |

FOREIGN PATENT DOCUMENTS

| | | | | |
|---|---|---|---|---|
| CN | 1797490 | A * | 7/2006 | G08C 17/02 |
| CN | 100386782 | C * | 5/2008 | G08C 17/02 |
| CN | 201830288 | U * | 5/2011 | |
| CN | 103099603 | A * | 5/2013 | A61B 5/0013 |
| CN | 103926912 | A | 7/2014 | |
| CN | 104138249 | A * | 11/2014 | A61B 5/0022 |
| CN | 105581783 | A * | 5/2016 | A61B 5/0013 |
| CN | 206002869 | U | 3/2017 | |
| CN | 106717124 | A * | 5/2017 | G01S 11/14 |
| CN | 104486944 | B * | 10/2018 | A01K 43/00 |
| CN | 105975136 | B * | 3/2019 | G02F 1/13338 |
| CN | 110073301 | A * | 7/2019 | A01B 3/02 |
| CN | 209085657 | U * | 7/2019 | B62D 15/0215 |
| CN | 110139235 | A | 8/2019 | |
| CN | 113302952 | A * | 8/2021 | H04W 4/40 |
| CN | 113424461 | A * | 9/2021 | H04B 7/0695 |
| CN | 113906821 | A * | 1/2022 | H04W 68/005 |
| DE | 69737857 | T2 * | 2/2008 | C12N 9/0069 |
| DE | 102008031681 | A1 * | 1/2010 | G01S 17/58 |
| DE | 112011103348 | T5 * | 7/2013 | H01L 27/14603 |
| DE | 102020002236 | A1 * | 10/2020 | G01S 17/10 |
| DE | 112019006074 | T5 * | 8/2021 | H01L 27/14601 |
| DE | 112020001131 | T5 * | 1/2022 | G01S 17/10 |
| EP | 2297594 | B1 * | 9/2016 | G01S 17/58 |
| EP | 2783549 | B1 * | 11/2017 | H04B 10/07 |
| EP | 3294042 | A1 * | 3/2018 | H04B 10/07 |
| EP | 3753766 | A1 * | 12/2020 | B60J 3/0291 |
| FR | 2729235 | A1 * | 7/1996 | G03B 7/093 |
| FR | 2839363 | A1 * | 11/2003 | F41G 7/226 |
| GB | 2585437 | A * | 1/2021 | G01S 17/10 |
| JP | 2000022514 | A * | 1/2000 | H03K 17/941 |
| JP | 3692149 | B2 * | 9/2005 | C12N 9/0069 |
| JP | 2005316724 | A * | 11/2005 | |
| JP | 2007026487 | A * | 2/2007 | G11B 7/0901 |
| JP | 2007141928 | A * | 6/2007 | |
| JP | 4607742 | B2 * | 1/2011 | |
| JP | 2013122443 | A * | 6/2013 | A61B 5/0013 |
| JP | 5520937 | B2 * | 6/2014 | H04N 5/365 |
| JP | 2014239871 | A * | 12/2014 | A61B 5/0022 |
| JP | 2015181122 | A * | 10/2015 | G01N 23/2257 |
| JP | 2015194504 | A * | 11/2015 | G01J 1/0403 |
| JP | 2016190052 | A * | 11/2016 | A61B 5/0013 |
| JP | 2018033257 | A | 3/2018 | |
| JP | 2018097874 | A * | 6/2018 | A61B 5/0022 |
| JP | 2018157387 | A * | 10/2018 | H01L 27/146 |
| JP | 6673497 | B2 * | 3/2020 | G01N 21/64 |
| JP | 2020034522 | A * | 3/2020 | G01J 1/44 |
| JP | 6929671 | B2 * | 9/2021 | H01L 27/146 |
| KR | 2124353 | B1 * | 6/2020 | G01V 1/02 |
| KR | 20200092074 | A | 8/2020 | |
| TW | 200820750 | A * | 5/2008 | H04N 5/363 |
| TW | 200919210 | A * | 5/2009 | |
| TW | 200926033 | A * | 6/2009 | |
| TW | 202113392 | A * | 4/2021 | G01S 17/10 |
| TW | 202119946 | A * | 6/2021 | A24F 40/51 |
| WO | WO-9740381 | A1 * | 10/1997 | C12N 9/0069 |
| WO | WO-0035548 | A1 * | 6/2000 | A63H 3/28 |
| WO | WO-0125681 | A1 * | 4/2001 | E01F 9/40 |
| WO | WO-03019222 | A2 * | 3/2003 | G01R 35/04 |
| WO | WO-2005050156 | A2 * | 6/2005 | A61B 1/227 |
| WO | 2008016500 | A3 | 3/2008 | |
| WO | WO-2010000751 | A1 * | 1/2010 | G01S 17/58 |
| WO | WO-2014145030 | A2 * | 9/2014 | A62B 18/02 |
| WO | WO-2015188268 | A1 * | 12/2015 | B25J 13/00 |
| WO | WO-2018084268 | A1 * | 5/2018 | G01N 21/64 |
| WO | WO-2018087608 | A1 * | 5/2018 | B60J 3/0291 |
| WO | WO-2019245297 | A1 * | 12/2019 | H04L 41/0896 |
| WO | WO-2020045124 | A1 * | 3/2020 | G01J 1/44 |
| WO | WO-2020106813 | A1 * | 5/2020 | G01S 17/894 |
| WO | WO-2020125839 | A1 * | 6/2020 | G06F 21/31 |
| WO | WO-2020167857 | A1 * | 8/2020 | H04B 7/0695 |
| WO | WO-2020182591 | A1 * | 9/2020 | G01S 17/10 |
| WO | WO-2021108680 | A1 * | 6/2021 | G05B 17/02 |
| WO | WO-2021195455 | A1 * | 9/2021 | A24F 40/40 |
| WO | WO-2022081785 | A1 * | 4/2022 | A24F 40/48 |
| WO | WO-2023039070 | A2 * | 3/2023 | G06F 1/1686 |

OTHER PUBLICATIONS

Anastasi et al., Ad Hoc Networks 7 (2009) 537-568.
Cao et al., Towards Energy-efficient Wireless Networking in the Big Data Era: a Survey, IEEE Communications Surveys & Tutorials, vol. 20, No. 1, First Quarter 2018.
de Meester et al., SERIF:A Semantic Exercise Interchange FormatConference: Proceedings of the 1st International Workshop on LINKed EDucation, Oct. 2015.
Khan et al., Energy management in Wireless Sensor Networks: a survey. Computers and Electrical Engineering, Elsevier, 2014, vol. 41, Jan. 2015, p. 159-176.
Mouser Electronics News Release, Aug. 16, 2018.
Ouf et al., Effectiveness of using WiFi technologies to detect and predict building occupancy, Sust. Buildi. 2, 7 (2017).
RadioMaze, Inc., "WiFi signals enable motion recognition throughout the entire home," Dec. 4, 2017.
sensorswarm, 2018.
Serale G., et al., Model Predictive Control (MPC) for Enhancing Building and HVAC System Energy Efficiency: Problem Formulation, Applications and Opportunities, Energies 2018, 11, 631; doi:10. 3390, Mar. 12, 2018.
Dai, Wenbin, et al. "Toward self-manageable and adaptive industrial cyber-physical systems with knowledge-driven autonomic service management." IEEE Transactions on Industrial Informatics 13.2 (2016)L pp. 725-736. (Year: 2016).
González-Briones, Alfonso, et al. "Energy optimization using a case-based reasoning strategy." Sensor 18.3 (2018): pp. 1-27. (Year: 2018).
Jayakumar, Geetha, and Ganapathy Gopinath. "Ad hoc mobile wireless networks routing protocols—a review." Journal of Computer Science 3.8 (2007): pp. 574-582. (Year: 2007).
International Search Report for International application No. PCT/US22/36676, Dec. 5, 2022.

(56) References Cited

OTHER PUBLICATIONS

International Search Report for PCT/US22/42915, Feb. 23, 2023.
Chowdhury, M. E. H., et al., "A Low-Cost Closed-loop Solar Tracking System Based o the Sun Position Algorithm", Journal of Sensors, vol. 2019, Article ID 3681031, 11 pp.
Kreider, D., and Lahr, D., "Trapezoidal Rule and Simpson's Rule", 2002, 2008, 2010.
Written Opinion of the International Searching Authority for PCT/US22/36676, Dec. 5. 2022.

\* cited by examiner

EXTERNAL ACTIVATION OF QUIESCENT DEVICE

FIELD

The present disclosure relates to turning on sleeping devices. More specifically, the present disclosure relates to signaling a device to wake it up, and sending the device encoded information which gives it instructions.

SUMMARY

This summary is provided to introduce a selection of concepts in a simplified form that are further described below in the Detailed Description section. This summary does not identify required or essential features of the claimed subject matter.

In embodiments, a light detection circuit adapted to receive a light signal from a light source is disclosed. This light detection circuit comprises: a high pass filter coupled to the light detection circuit that when receiving light of at least a given intensity produces a spike; a power manager chip coupled to the light detection circuit that upon receipt of the spike enables power to the microcontroller; a timer that measures a time between spikes; and executable instructions in memory that upon execution by the microcontroller perform the following actions: detect a spike; increment a spike counter; use the timer to measure time between spikes; when the time between spikes exceeds an "END OF WORD" length, clear the spike counter; and when the spike counter reaches a wakeup threshold then interpret subsequent spikes and delay lengths as a transmitted message.

In embodiments, the wakeup threshold is of sufficient length to allow the microcontroller to boot.

In embodiments, the transmitted message is in modified morse code.

In embodiments, in the modified morse code a DOT is a delay of 1 time duration, a DASH is a delay of 3 time durations, an END OF PART OF A LETTER is a delay of 1 time duration, an END OF LETTER is a delay of 5 time durations, and an END OF WORD is a delay of 9 time durations.

In embodiments, the transmitted message comprises a message portion and an authentication portion.

In embodiments, the delay of one time duration is about 8 ms.

In embodiments, the light detection circuit adapted to receive a light signal from a light source is adapted to receive a transmitted message as the light signal.

In embodiments, the transmitted message is stored in memory.

In embodiments, the light detection circuit adapted to receive a light signal from a light source is adapted to receive multiple messages from the light signal.

In embodiments, the executable instructions that upon execution by the microcontroller further perform the following actions: receiving an out-of-bound authentication request; and transmitting contents of a buffer in the memory.

In embodiments, the light detection circuit is adapted to generate a spike based off of the light signal.

In embodiments, a device with a microcontroller, memory, and transmitter is disclosed, comprising: a light detection circuit operationally able to receive a light signal from a light source, and operationally able to use the light signal to signal a power management circuit; the power management circuit operationally able to boot up the microcontroller; the microcontroller operationally able to scan the light signal for a message; and the transmitter operationally able to transmit at least a portion of the message.

In embodiments, the message is encoded in modified morse code wherein a DOT is a signal of one time duration, a DASH is a signal of 3 time durations, and END OF PART OF A LETTER is a signal of 2 time durations, an END OF LETTER is a signal of 5 time durations; and an END OF WORD is a signal of 9 time durations.

In embodiments, one time duration comprises a time=>10 ms.

In embodiments, one time duration comprises a time <10 ms.

In embodiments, the message comprises a message portion followed by an authentication portion.

In embodiments, the device further comprises a filter, wherein the filter is a high pass filter.

In embodiments, a method is disclosed, whereby a device is externally activated, implemented by a device with one or more computers with memory, one or more processors, a light detection circuit, a high pass filter, and a transmitter comprising: receiving a light signal by the light detection circuit; the light detection circuit passing the light signal to a filter, the filter producing a series of spikes of at least a threshold intensity when the light signal is of sufficient intensity, the spikes a multiple of a base time apart; and powering the one or more processors upon a receipt of the spike.

In embodiments, the method further comprises: scanning the light signal to detect a spike; measuring a delay length between the spike and a subsequent spike; when the spike is detected, incrementing a spike counter; when the delay length exceeds an "END OF WORD" delay, clearing the spike counter; and when the spike counter reaches a wakeup threshold then interpreting subsequent spike-delay lengths as a transmitted message.

In embodiments, the transmitted message is two letters in modified morse code and a third authentication letter in modified morse code.

These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
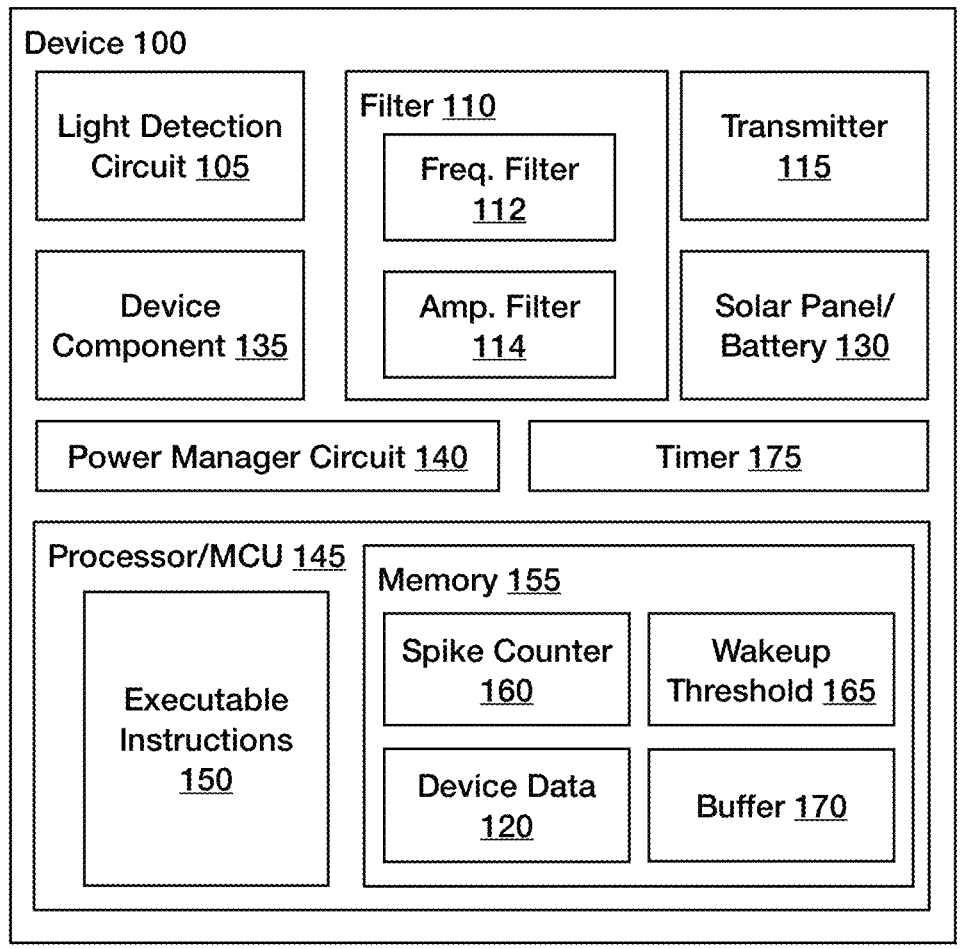
FIG. 1 discloses a computing system in conjunction with which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to external activation of quiescent devices.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects. Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Light memory) device, a portable compact disc read-only memory (CDROM), an optical storage device, and a magnetic storage device. Computer program code for carrying out operations of the present embodiments may be written in any combination of one or more programming languages.

Embodiments may be implemented in edge computing environments where the computing is done within a network which, in some implementations, may not be connected to an outside internet, although the edge computing environment may be connected with an internal internet. This internet may be wired, wireless, or a combination of both. Embodiments may also be implemented in cloud computing environments. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by general or special purpose hardware-based systems that perform the specified functions or acts, or combinations of general and special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

I. Overview

A quiescent device (in a state where it is currently not harvesting data or sending data, though it may be on schedule such that it will harvest data or send data at a known later time) is waken up by flashing an encoded message at it. The device may have never been turned on, such as when it is originally commissioned. The device is first woken up by a series of external light signals sent by an external device. These external light flashes make up a message in modified morse code that is sent to the device. The light signals trigger a power management circuit that boots a processor. The light signals are also sent through a process that transfers the light flash into a voltage spike upon sufficient brightness and sufficient speed of activation. When the device fully wakes up, the message is read. Upon request from another device, the sensor sends an authentication code that was provided in the message. This enables a single user action to wake the device up and set it up with networking credentials.

II. Exemplary System Embodiments

With reference to FIG. 1, a device is disclosed that may be used, in whole, or in part, in any of the embodiments disclosed herein. The device 100 may be any sort of device that will be woken up from a sleep state. For example, the device 100 may be initially being installed, and so needs to be commissioned. The device 100 may be in a sleep state and may be wakened from it out of its normal schedule. The device 100 may be a low power device, such as a low power sensor. The device 100 may comprise a light detection circuit 105, and/or a filter 110. The filter 110 may be comprised of a frequency filter 112, which passes light of a certain frequency and rejects other frequencies. This frequency filter 112 may be a band-pass filter, a notch filter, a high pass filter, etc. In some embodiments, the light detection circuit 105 and the filter 110 may be integrated. The light detection circuit 105 may be adapted to receive a light signal from a light source. The light detection circuit 105 may produce voltage when photodiodes in the circuit are hit by a flash of light. The intensity of the voltage may rely on the intensity of the light that hits the photodiodes. For example, the frequency filter 112 may only allow voltage equivalent to a light of 45 lumens or higher through. The voltage produced by the light detection circuit 105 may be dependent upon specifics of the light detection circuit 105 and the frequency filter 112.

In some embodiments, the light may also be sent through an amplitude filter 114 that only passes light though that is of a certain amplitude (brightness). This filter may be a digital threshold. The pairing of the frequency filter 112 and the amplitude filter 114 may allow a light pulse through that has a fast-enough frequency with a sufficiently high light level. The frequency filter 112 and amplitude filter 114 may be a passive high pass filter coupled with a digital gate which turns the voltage signal into either a "1" or "0". The "1" may be a very narrow pulse with a rising and trailing edge that appears to be a spike. This digital gate 114 may convert the analog signal output from the frequency filter 112 to a digital circuit. The digital circuit may then be received by a power management circuit 140.

In some embodiments, one purpose of the filter may be to guard against saturation of the photodiodes. The filter may also guard against varying light levels causing false positives and/or false negatives. For example, the filter 110 may filter out noise that does not meet a digital threshold (dependent on the voltage, which itself is dependent on the intensity of the light), and may filter out low frequency noise. Thus, ambient light in a space that the device is in may not trigger the device 100. Slowly rising light may not trigger the device, random flashes of light, such as from lamps being turned on may not produce a complete message so the device 100 is not turned on, etc. A timer 175 may keep track of the time between successive spikes. A spike (e.g., processed by the filter 110) followed by the time to the next spike may be referred to as a "pulse." This pulse may be a time that indicates the time from one spike to the next. A power manager circuit 140 maybe operationally able to send power to an processor/MCU upon receipt of a spike that has passed through frequency filter 112 and been digitized by a digital gate, which may be a or a portion of an amplitude filter 114. The amplitude filter 114 may be part of the frequency filter 112, part of the power management circuit 140, or a separate component.

A transmitter 115 may allow the device 100 to send device data 120 to another entity, such as a personal computing device such as a cell phone, a controller that controls the device 100, a device 100, or a different entity. The transmitter may be wired, wireless, some combination, etc. The transmitter may be a bluetooth mesh, a 2-wire multidrop, a 3-wire multidrop, some combination of the above, a different sort of transmitter altogether, and so on. The device data 120 may be stored in memory.

A solar panel and/or a battery 130 may be included. In some embodiments, the solar panel may be configured to also function as the light detection circuit 105. The memory 155 may comprise a spike counter 160, which holds an internal value of how many spikes have been received. The memory 155 may also comprise a wakeup threshold 165, which determines the number of spikes which should be received before a message is read. A buffer 170 may be part of the memory 155 that holds messages or parts of messages that have been sent to the device 100. A power manager circuit 140 may be powered in part by the voltage from the light detection circuit, the power manager circuit may use the voltage as a signal to connect a processor 145 to the battery 130. The processor may comprise high-efficiency signal processing, low power, low cost, or may have other features. The processor may be a microcontroller. The processor 145 may have executable instructions on board which can make certain decisions, such as when to send a message. These executable instructions 150 may be embedded within firmware, within software, within hardware or within some combination of two or three of them. The executable instructions 150 may also decode received messages, make calculations, and so on. The device may also have device components 135 which provide other services of the device 100.

III. Method Embodiments

Figure 2:
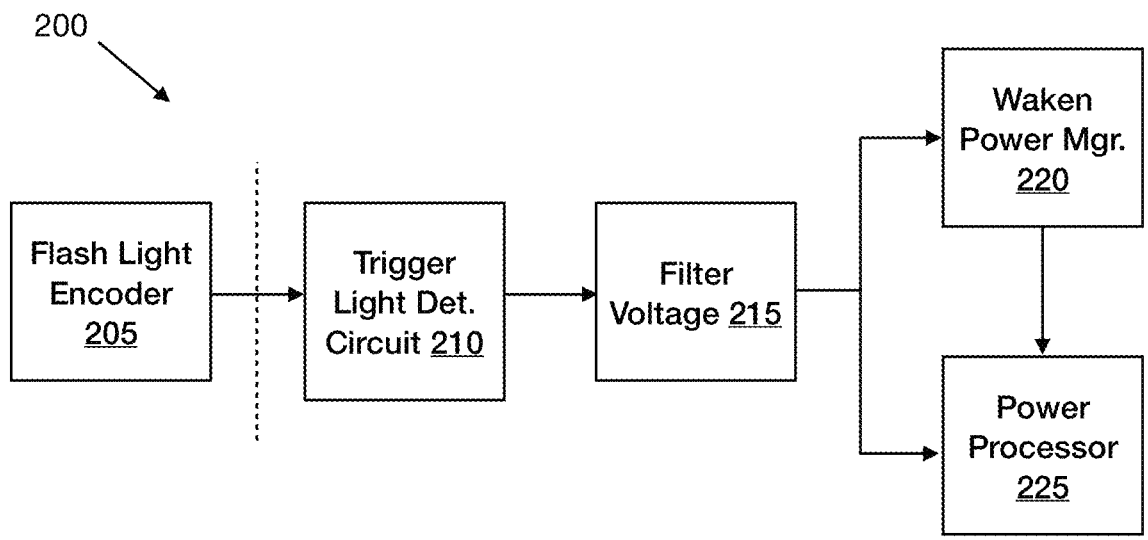
FIG. 2 discloses methods that may be used to power a processor that may be used with embodiments disclosed herein.

With reference to FIG. 2, a flowchart 200 discloses methods that may be used with embodiments disclosed herein. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting. In some embodiments, method 200 may be implemented in one or more processing devices (e.g., a digital processor such as the processor 145), an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 205, a flash light encoder sends a message to the device 100. The flash light encoder is a device that is able to flash messages of types described herein. At operation 210, photodiodes in the light detection circuit receives the light and generate voltage based on the intensity of the light received. When the light is of sufficient intensity, the light detection circuit 105 is triggered 210. In some embodiments, when the light detection circuit 105 is triggered, one or more transistors in the light detection circuit switch between a lower voltage and a higher voltage to produce a voltage spike. In some embodiments, the size of the spike is proportional to the intensity of the light. In some embodiments, the voltage size is the spike height. At operation 215, the spike is passed through a filter. In some embodiments, this is a band-pass filter that only allows voltages of a certain frequency or higher through. This filters out low frequency waves, such as the light in a room getting suddenly brighter when, for example, the sun appears from under a cloud. In some embodiments, after the band-pass filter, the voltage is passed through an amplitude filter 114. These two filters may be used so that only light of a certain intensity above a certain frequency will trigger the power manager to, e.g., prevent random light from starting up the processor 145. In some embodiments, the spike is then elongated to signal to the power manager chip 140 that it should enable power to the MCU 145. This elongation may satisfy a debouncer in the power manager circuit. At operation 220, the power manager 140 (in some instances elongated into a pulse with a leading and a trailing edge), is awakened by a spike that was able to make it through the filter 110. After being awakened, the power manager connects the battery 130 to the processor 145, powering it. At operation 220, the power manager chip 140 enables power to the MCU. At operation 225, the processor 145 boots a kernel, which may be a Zephyr kernel. The interrupt handlers are also registered to respond to interrupts on the MCU I/O lines. After this process is complete, an MCU interrupt is produced for each rising edge of the incoming signal spike and interrupt handler code is run. This process requires time to complete before a message may be accurately received. Thus, a wakeup sequence that lasts for some duration of time is ideally used to allow the MCU to receive power and for it to fully boot before attempting to receive its eventual message.

The signal has already gone through a filter 110. To avoid triggering a message decode on a false trigger, the spikes of the wakeup sequence are counted and the message is not decoded until a specified threshold of spikes has been received. If a delay between signal spikes that is greater than the modified morse code part of speech "END OF WORD" is received, then the spike counter is cleared. This is to ensure that the wakeup signal spikes are received in a timely manner that would suggest a deliberate wake up of the device, and as such, prevents a message decode being triggered by random noise, such as by turning on the lights in the room where the device is located, even if it is done multiple times.

After the wakeup threshold is met, i.e., the spike counter reaches the wakeup threshold, the code running on the processor 145 waits for a delay the length of the "END OF WORD" part of speech before beginning to interpret subsequent spikes and delays as part of the transmitted message. After meeting the wakeup threshold and receiving a delay that translates, in part, to an "END OF WORD" part of speech, subsequent spikes and delays will be interpreted as part of the transmitted message until another delay "END OF WORD" part of speech is received.

Figure 3:
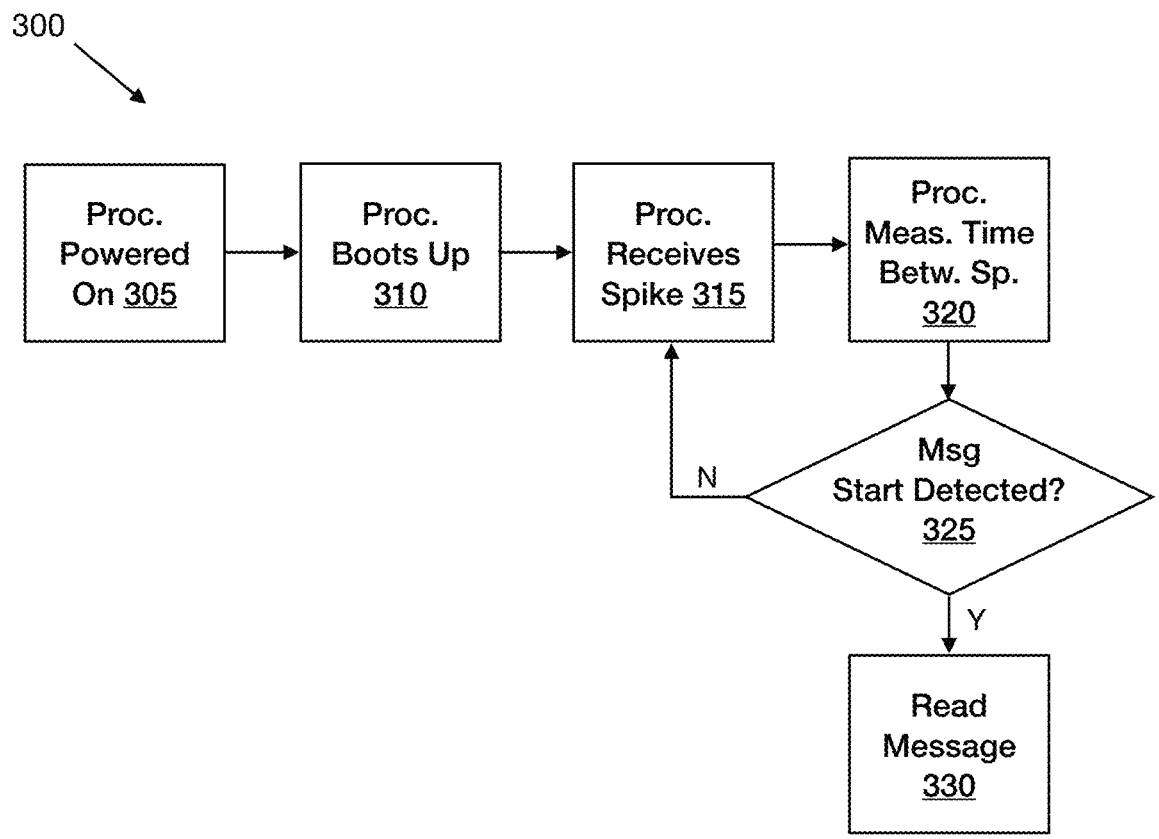
FIG. 3 discloses methods that may be used to read a message that may be used with embodiments disclosed herein.

The above ideas may be incorporated in many different algorithms. One that may be used is shown with reference to FIG. 3. FIG. 3 discloses a method of the processor 145 reading a message. With reference to FIG. 3, a flowchart 300 discloses methods that may be used with embodiments disclosed herein. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting. In some embodiments, method 300 may be implemented in one or more processing devices (e.g., a digital processor such as the microcontroller 145), an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

The first time the message is transmitted, the entire message more than likely will not be received because of the delay it takes to power the processor 145 and start running the executable instructions 150. Therefore, the message may be sent multiple times to ensure that the processor 145 is fully booted up before the last message sent has begun to be received. On subsequent message transmits, the message will be eventually received, as the wakeup threshold will have been met by a previous transmission of one of the messages and the signal "END OF WORD" part of speech will have been received. In some embodiments, a spike counter holds the number of spikes that have been received. In embodiments, to ensure that the whole message can be received, the processor 145 may wait for a certain time (e.g., measured in a number of spike counters), to have passed since the message began to be sent prior to decoding the message. In some embodiments, the processor may wait for a certain time measured in actual time. In some embodiments, the processor may measure the time to wait in a different way. In embodiments, the spike counter is reset when a delay after a spike is detected that is longer than the "END OF WORD" part of speech and a spike threshold has not yet been achieved. This threshold may be some number of signal spikes, such as 5, 9, etc., that is long enough to ensure that the processor has time to boot. At operation 305, the processor 145 is powered on. At operation 315, the processor boots up 310. While the processor is powering on and booting up, a message is continually sent until the processor is fully booted up, at which point the whole message can be read. At operation 315, the processor receives a spike. At operation 320, the processor measures the time between this spike and a previous spike received. If, at decision point 325, the measured time is a message start time, then at decision point 325 it is determined if a valid message start has been detected. If so, then at operation 330, the message is read. If the message start has not been detected, then back at operation 315, the processor again checks for another spike to be received.

Figure 4:
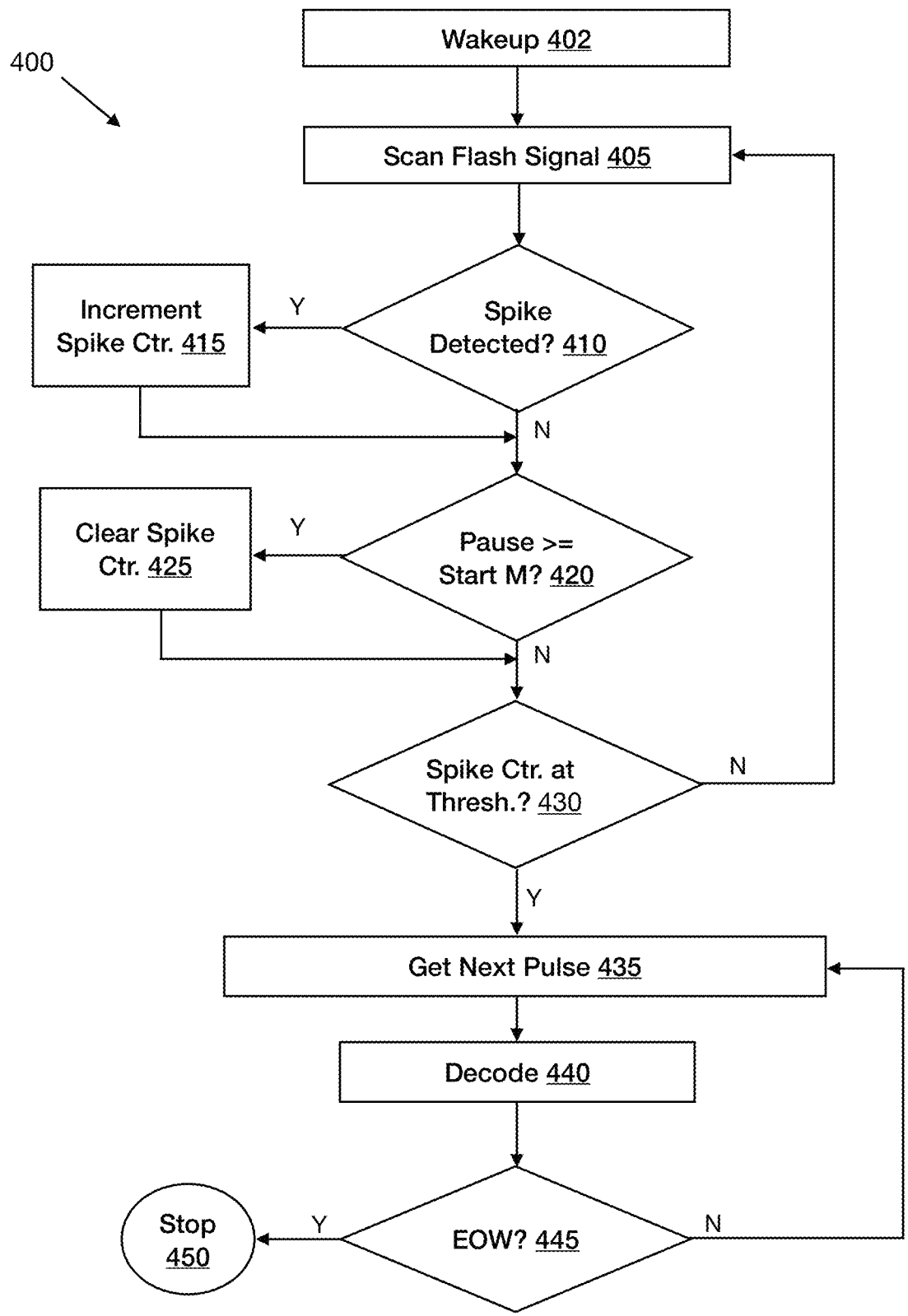
FIG. 4 discloses embodiments that may be used to detect a message start, as used in embodiments described herein.

With reference to FIG. 4, a flowchart 400 discloses methods that may be used with embodiments disclosed herein. This flowchart 400 describes embodiments that may be used to detect a message start. At operation 402, a device wakes up. At operation 405 a light signal is scanned. At decision point 410 it is determined if a spike is detected. If so, then at decision point 415 a spike counter is incremented. The spike count has a wake-up threshold 165. This threshold may be a non-zero integer that is set long enough to ensure that the processor 145 has sufficient time to boot up. Examples may be 5, 4, 3, 10, etc. At decision point 420, the value of the spike counter is checked. At decision point 420, the length of the delay that follows the pulse is measured. If it is greater or equal to the length of a start message, then at operation point 425 the spike counter is cleared. In some embodiments, if the delay length exceeds the "END OF WORD" length in modified morse code (as discussed with reference to FIGS. 5 and 6), then the spike counter is cleared. This ensures that if insufficient spikes have been detected but the message detected is at the end (meaning spikes have been missed), a message will not be read. At decision point 430, the value of the spike counter is checked. If it is at a wakeup threshold value 165, then at operation 435, the next pulse is fetched. At operation 440 the spike and delay is decoded. At decision point 445 it is determined if the delay is the same length as END OF WORD delay. If not, then at operation 435, a next spike and delay is fetched. If so (an END OF WORD delay has been detected), at operation 450, the message is determined to be finished.

Once a message start has been discovered, subsequent signal pulses are interpreted as part of the transmitted message. The time between signal spikes is measured. This is discussed with reference to FIGS. 9, 10, and 11. The processor 145 decodes the delays between the spikes using the modified morse. In embodiments, the sequence of delays decoded into time units are buffered 170 in sequential order, in LIFO order, etc. In some embodiments the sequence of delays decoded into time units are partially stored in a buffer. In some embodiments, the buffer 170 is a designated location, in some embodiments, the buffer location is determined on the fly. In embodiments, single word messages are received. In some embodiments, when an "END OF WORD" delay is found, a decode of the buffer 170 (that the message may have been stored in) is performed and a message is produced. The produced message may be stored in the same buffer (e.g., 170) or a different buffer that is overwritten with subsequent messages received. This ensures that the last message received is the message stored. In some embodiments, other methods are used. For example, multiple words may be in a message. In such cases, an end of message signal part of speech may be defined. When the end of message signal part of speech is found, a decode of the parts of speech buffer 170 may be performed, with a message being produced. Multiple buffers (e.g., 170) may be used, etc.

Figure 5:
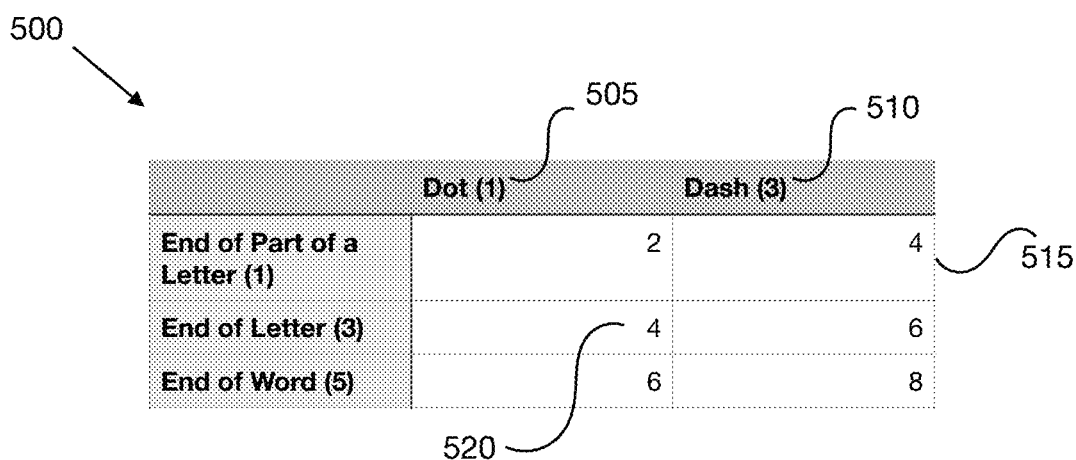
FIG. 5 describes a current morse code chart.
Figure 6:
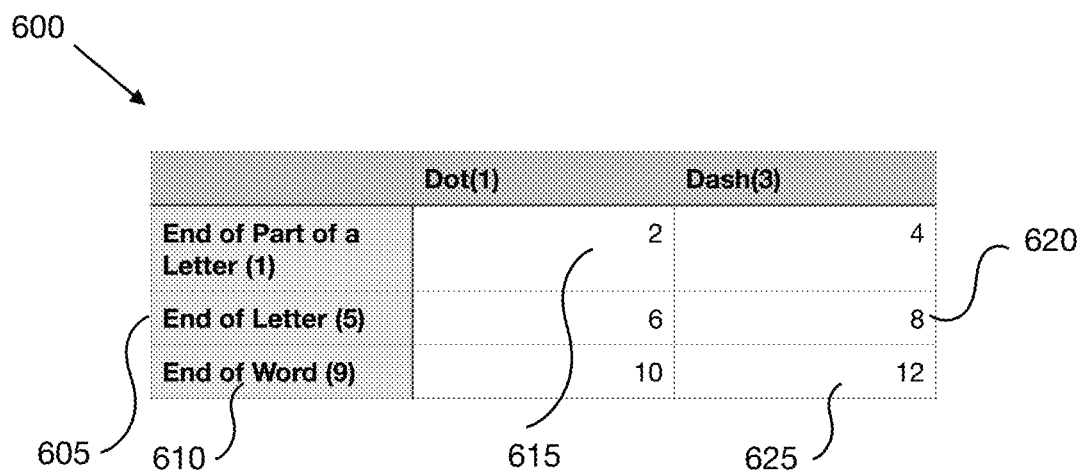
FIG. 6 discloses a modified morse code chart, as used in embodiments described herein.

Turning now to FIGS. 5 and 6, an embodiment of message coding and decoding is disclosed. FIG. 5 at 500 describes a current International Morse Code chart. International Morse Code specifies duration, some on rising edges and some on trailing edges. For example, the durations for a DOT and DASH are durations between a rising edge and a trailing edge. The "END OF PART OF A LETTER", "END OF LETTER", and "END OF WORD" parts of speech are durations for when the morse code signal is low, and therefore the duration between the falling edge and rising edge. For example, FIG. 9 at 905 shows a DOT, e.g., a rising edge followed by a duration of 1 time unit. An END OF PART OF A LETTER 910 is a trailing edge followed by one time unit.

FIG. 6 at 600 discloses a modified morse code chart, similarly, that describes the delays for each as used in embodiments described herein. In this modified morse code, there are only single signal spikes. As such, the term "delay" is used to describe the elapses between spikes where that duration also corresponds to a morse code part of speech. In normal morse code, a base time duration may be of one time unit. The DOT(1) 505 and DASH(3) 510 indicate that a delay for a DOT is 1× the base unit, and the DASH is a delay that is 3× the base unit. In an exemplary embodiment, a delay of one time duration is around 8 ms. There may be a threshold such that one time unit has some give on each side, hence the "around." The give on each side may be dependent on other implementation details. The matrices shown in FIGS. 5 and 6 are the combinations of resulting on/off parts of speech. In traditional morse code, the signal on duration and the signal off duration are measured, with each used to decode the specific part of speech. Modified morse code disclosed herein only tracks the delays between rising edges. The rising edge may be defined by a spike. This creates combinations in traditional International Morse code that cannot be distinguished. For example, a DASH/END OF PART OF A LETTER 515 and DOT/END OF LETTER 520 that are both 4× the base unit. This is significant, as in an exemplary embodiment disclosed here, only an edge and a delay to the next edge is generated, rather than a leading edge, a trailing edge, and a delay. As such the duration of the signal on plus the length of the signal off is the information that is available. This is discussed with reference to FIGS. 10, 11, and 12. With traditional morse code, if a duration of 4× between signal spikes appeared, there is no way to know if the signal desired was a DASH/END OF PART OF A LETTER 515 or a DOT/END OF LETTER 520.

FIG. 6 at 600 discloses a modified morse code chart. To avoid combination collisions, the multiples of the base timing unit that are assigned to each part of speech are adjusted to be unique. As such, the END OF LETTER signal 605 equals 5 time durations. The END OF WORD signal 610 equals 9 time durations. These time durations are added to the DOT or DASH time duration to produce a unique time duration. As an example, the DOT (1) followed by an END OF PART OF A LETTER (1) 615 will take 2× the base unit, a DASH (3) followed by End of Letter (5) will take 8× the base unit 620, a DASH (3) followed by an END OF WORD(9) 625 will take 12× the base unit, etc.

Figure 7A:
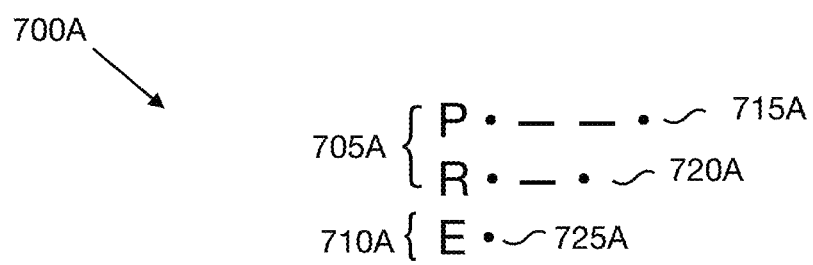
FIGS. 7A and 7B disclose exemplary messages that may be sent to the device 100.

FIGS. 7A at 700A and 7B at 700B disclose creation of messages using modified morse code in greater detail. Different letter combinations specify different commands. In some embodiments, the message comprises a series of letters 705A that specify the message followed by a series of letters or other characters that are used for authentication 710A. The message will be followed by an END OF WORD 610, when the message is a single word. In some exemplary embodiments a message will comprise two message letters 715A, 720A, followed by an authentication character 725A unrelated to the message (and possibly generated randomly by the signaling device) that will be passed back to the signaling device to be used, e.g., for network authentication.

In some embodiments, these messages are generated by a processor/MCU in a light encoder as strings of letters and are then converted to modified morse code parts of speech. In some embodiments, the messages are created directly as modified morse code parts of speech. The modified morse code parts of speech may then be signaled to the device 100 using a light source. In some instances a light on a device that allows the specific on/off timing of the light to be programmed or otherwise specified is used. In some embodiments, a personal computing device, such as a phone with a flashlight is used. As previously discussed, a message may be originally output multiple times. For example, a message may be output for two seconds to be sure that the device 100 may boot up and that the wakeup threshold 165 (a specified number of pulses) can be met to avoid triggering a message decode on a false trigger. The message may be used as both a preamble to turn on the device 100 and as the actual message that instructs the device 100 in its next action. In some embodiments, the number of times a message is output depends on the length of the message.

Figure 7B:
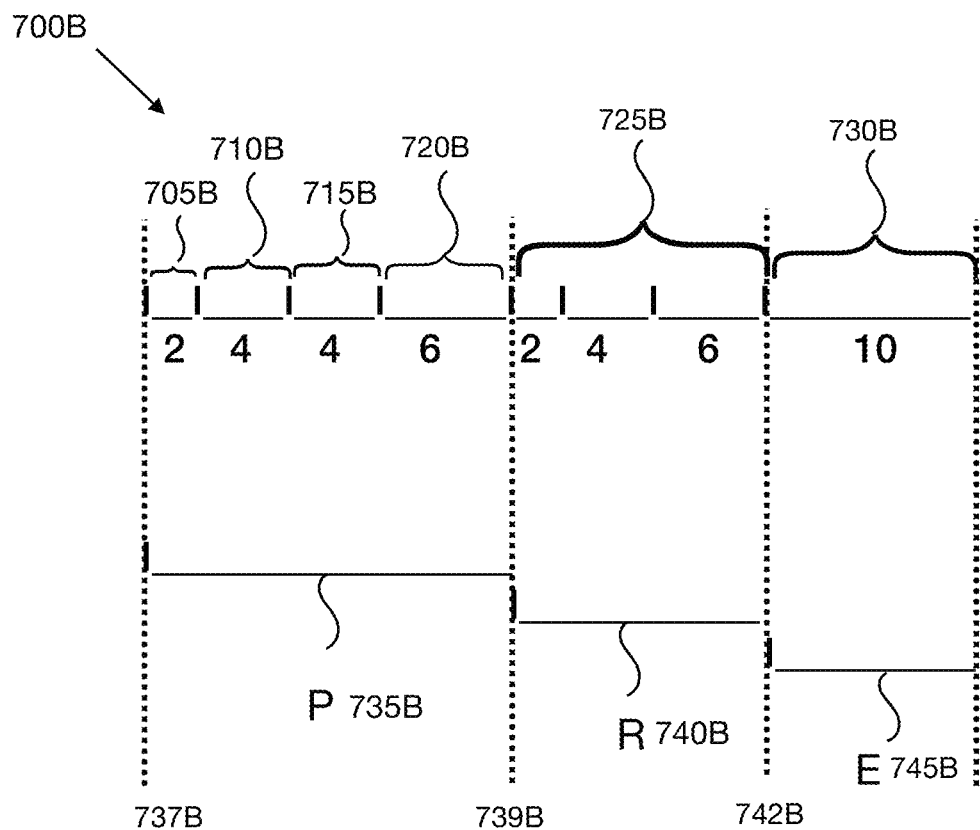

FIG. 7A at 700 shows the international morse code for a message "PRE". This message comprises a message part—"PR" 705 (which may stand for "provision"), and an authentication part chosen at random—"E" 710. FIG. 7B discloses the message translated into a form that may be sent to wake up a device. The P signal 735B in international morse code is . - - . 715A. More completely, this works out to spike 737B followed by a delay equal to DOT (1 time period)+Part of Word (1 time period) to produce 2 time periods 705B, spike 739B, DASH (three time periods)+Part of Word (1 time period) to produce 4 time periods 710B, spike 742B, DASH (three time periods)+Part of Word (1 time period) to produce 4 time periods 715B, spike, DOT (1 time period+END OF LETTER (5 time periods) to produce 6 time periods 720B. The R 720A is a DOT DASH DOT, which corresponds to spike 739B, DOT (1 time period+END OF LETTER (5 time periods) to produce 6 time periods 720B. The R signal 740B in international morse code is DOT DASH DOT 720. The signal that represents the modified morse code letter R 740B is the set of spikes and delays 725B corresponding to a spike followed by a delay of 2 time periods (DOT followed by an End of Part of Letter), a spike followed by a delay of 4 time periods (DASH followed by an End of Part of Letter), and a spike followed by a delay of 6 time durations (DOT followed by an END OF LETTER). The last letter in the word, E 725A is a DOT (1 time duration), but because it is the last letter in the word, it is followed by an END OF WORD signal 610, which corresponds to (1+9) 10 time durations. This results in a spike 742B followed by a delay of 10 time periods 730B, 745B. With the receipt of the END OF WORD, in some embodiments, this message is known to be finished. Some messages may be longer than a single word, in which case, the modified morse code table may be extended.

In some embodiments, these messages are generated by a light encoder 205 as strings and are then converted to morse code parts of speech. In some embodiments, the messages are created directly as morse code parts of speech. The morse code parts of speech may then be signaled to the device 100 using a light source. In some instances a light on a device that allows the specific on/off timing of the light to be programmed or otherwise specified is used. In some embodiments, a personal computing device, such as a phone with a flashlight is used. As previously discussed, a message may be originally output multiple times. For example, a message may be output for two seconds to be sure that the device 100 may boot up and that the wakeup threshold 165 (a specified number of pulses) can be met to avoid triggering a message decode on a false trigger. The message is used as both a preamble to turn on the device 100 and as the actual message that instructs the device 100 in its next action. In some embodiments, the number of times a message is output depends on the length of the message.

The message itself instructs the sensor to perform some action. Some possible states are: Wakeup—The light source is used to pull the device out of a super-low-power state (shipping-sleep); Communication—The sequence/pattern emitted by the light source is used to set the state that the device wakes up in. i.e. provisioning mode, device firmware upgrade mode, diagnostics mode, etc.; Out-of-Band (OOB) Security—the sensor and the signaling device may use the flight as an additional communication medium to obfuscate the network onboarding process even further. This may be sent during the network setup in provisioning, etc.

Figure 8:
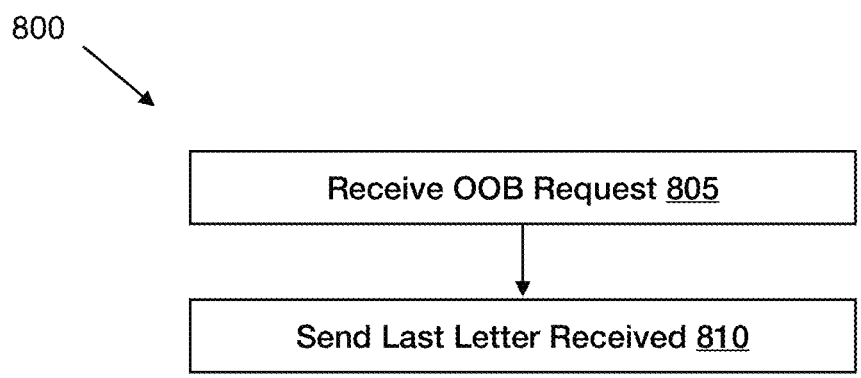
FIG. 8 discloses exemplary system behavior when an out of band authentication message is sent, as used in embodiments described herein.

FIG. 8 at 800 discloses exemplary system behavior when an out of band authentication message is sent. At operation 805, a request is received to provide an out of band authentication message. This message may have originally been sent by a flash light encoder 205. At operation 810, an authentication message may be transmitted, e.g., using the transmitter 115. In some implementations this authentication message may be the last letter sent to the device, which is not part of the message portion. In some embodiments, the authentication message 710A may be a message generated by the device 100, or determined by the device 100 using an algorithm. In some embodiments, the authentication message may be multiple characters long. In some embodiments, the authentication message may be stored in a buffer 170.

The authentication portion of a memory, such as the last character sent, may be stored in a buffer 170 stored in memory 155. Transmitting an authentication code may comprise transmitting the contents of an authentication buffer stored in memory 155 which holds the authentication portion of a message. When the authentication code is a single letter, such as E 725A, the E 725A may be stored in a buffer 170 and then sent when an authentication request is received. In some embodiments, a character as decoded may be stored in a buffer 170 that holds a single character; in such a system, the last letter in the message will be the one in the buffer that is then sent as the authentication code in response to the authentication request. In some embodiments, a buffer 170 may hold and send multiple characters. In some embodiments, a buffer may be used to hold the time between signals, such that an entire message may be stored prior to decoding.

Figure 9:
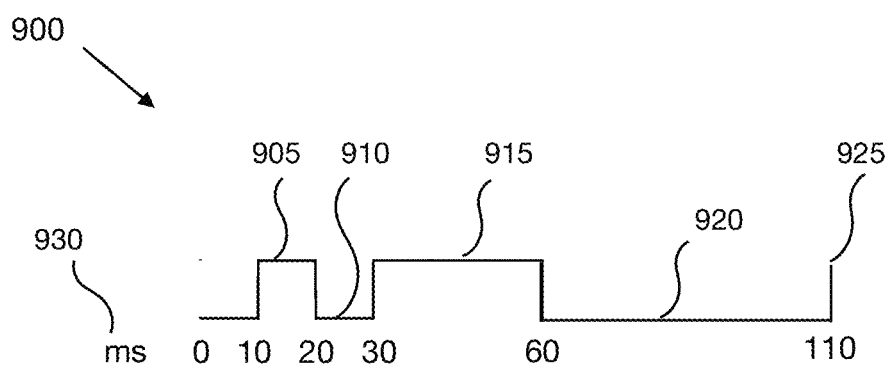
FIG. 9 discloses a digital signal generated by a light circuit without a high pass filter.
Figure 10:
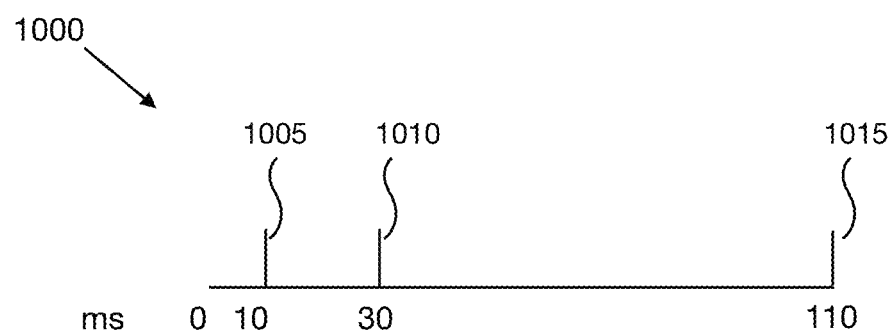
FIG. 10 discloses a digital signal generated by a light circuit with a high pass filter, as used in embodiments described herein.
Figure 11:
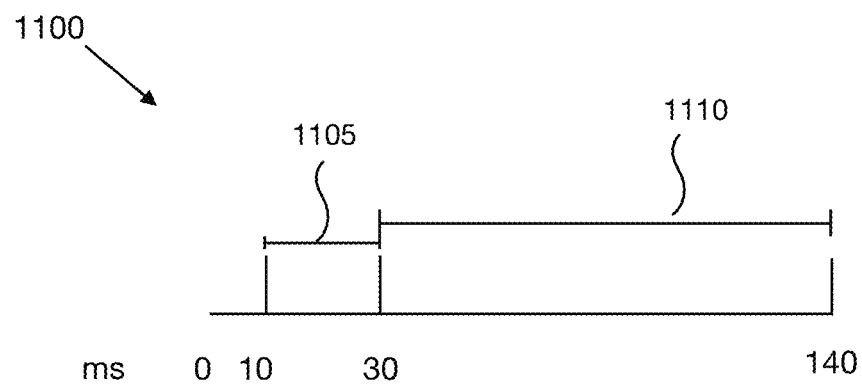
FIG. 11 discloses a digital signal from the perspective of a device receiving the signal through a high pass filter, as used in embodiments described herein.

FIG. 9 at 900 discloses a digital signal generated by a light circuit without a high pass filter. FIG. 9 at 900 specifically discloses a modified international morse code "A". The pulses in FIGS. 9, 10, and 11 are measured in ms 930, with a standard time duration of 10 ms. "A" is a DOT DASH, which is a pulse 905 (rising and training edge) of one time duration followed by an END OF PART OF LETTER 910 (a signal low of one time duration) followed by a DASH 915 of 3 time durations, followed by an END OF PART OF WORD 920 of 9 time durations. The next rising signal appears at 925. The signal that produces the A in morse code is not shown, but it may take many forms, as long as it is of sufficient amplitude. For example, it may appear similar to sine waves with pauses between them, a square digital signal, etc. If the signal is analog, it may then may be passed into a frequency filter 112, such as a high pass filter, digitized by the light detection circuit 105. The signal that is output from the frequency filter 112 may then be converted from an analog signal to a digital signal by, e.g., an amplitude filter 114, an analog to digital converter, etc.

FIG. 10 at 1000 discloses a digital signal generated by a light circuit with a high pass filter, as used in embodiments described herein. Only the rising edge of each pulse makes it through the filter 110. As such, the time between rising edges is measured. This gives spike 1005, which corresponds to the rising edge of the DOT; spike 1010, which corresponds to the rising edge of the DASH, and spike 1015, which corresponds to the next rising edge received. As shown with reference to FIGS. 5 and 6, the morse parts of speech base unit multiples have been adjusted such that each combination of morse high and morse low will produce a unique time duration.

FIG. 11 at 1100 discloses a digital signal from the perspective of a device receiving the signal through a high pass filter, as used in embodiments described herein. Two time measurements are decoded, the time from the rising edge of the DOT (transformed into a spike) to the rising edge of the DASH (transformed into a spike) 1105, which is 20 ms long, and time from the rising edge of the DASH (transformed into a spike) to the next rising edge (transformed into a spike) 1110, which is 80 ms long. Using the table 600, a DOT followed by an end of a part of letter is 2 base units long 615, and the base unit is 10 ms, so the time 1105 indicates a morse signal DOT followed by a morse signal END OF PART OF LETTER. The time 1110 measured between the rising edges (transformed into spikes) 1010 and 1015 is 8 base units long (10 ms*8), and so is a morse signal DASH followed by an END OF LETTER (8 units long). The letter is DOT DASH, which encodes to an "A".

In view of the many possible embodiments to which the principles of the technology may be applied, it should be recognized that the illustrated embodiments are examples and should not be taken as a limitation on the scope of the invention. For instance, various components of systems and tools described herein may be combined in function and use. We, therefore, claim as our invention all subject matter that comes within the scope and spirit of these claims.

We claim:

1. A device capable of external activation comprising:
a light detection circuit adapted to receive a light signal from a light source;
a high pass filter coupled to the light detection circuit that when receiving light of at least a given intensity produces a spike;
a power manager chip coupled to the light detection circuit that upon receipt of the spike enables power to a microcontroller;
a component capable of inhabiting: a detection state in which:
a spike is detected; and when a spike is found, a spike counter is incremented;
a timer that measures a time between spikes;
wherein when the time between spikes exceeds an END OF WORD length, the spike counter is cleared;
wherein when the spike counter reaches a wakeup threshold then subsequent spikes and delay lengths are interpreted as a transmitted message; and
wherein the wakeup threshold is of sufficient length to allow the microcontroller to boot.

2. The device of claim 1, wherein the transmitted message is in modified morse code.

3. The device of claim 2, wherein in the modified morse code a DOT is a delay of 1 time duration, a DASH is a delay of 3 time durations, and END OF PART OF A LETTER is a delay of 1 time duration, an END OF LETTER is a delay of 5 time durations, and an END OF WORD is a delay of 9 time durations.

4. The device of claim 3, wherein the transmitted message comprises a message portion and an authentication portion.

5. The device of claim 4, wherein the delay of one time duration is about 8 ms.

6. The device of claim 5, wherein the light detection circuit adapted to receive a light signal from a light source is adapted to receive multiple spikes separated in time as the light signal.

7. The device of claim 6, wherein the transmitted message is at least partially stored in a buffer.

8. The device of claim 6, wherein the light detection circuit adapted to receive a light signal from a light source is adapted to receive multiple messages as the light signal.

9. The device of claim 8, further comprising the component capable of inhabiting:
receiving an out-of-bound authentication request; and
transmitting contents of the buffer in the memory.

10. The device of claim 1, wherein the light detection circuit is adapted to generate a spike based on the light signal.

11. A device with a microcontroller, memory, and transmitter comprising:
a light detection circuit operationally able to receive a light signal from a light source, and operationally able to use the light signal to signal a power management circuit;
the power management circuit operationally able to boot up the microcontroller;
the microcontroller operationally able to scan the light signal for a message; and
the transmitter operationally able to transmit at least a portion of the message;
wherein the message is encoded in modified morse code;
wherein a DOT is a signal of one time duration, a DASH is a signal of 3 time durations, an END OF LETTER is a signal of 5 time durations; and an END OF WORD is a signal of 9 time durations.

12. The device of claim 11, wherein one time duration comprises a time of about 8 ms.

13. The device of claim 12, wherein one time duration comprises a time of about 10 ms.

14. The device of claim 13, wherein the message comprises a message portion followed by an authentication portion.

15. The device of claim 14, further comprising a filter, wherein the filter is a high pass filter.

16. A method implemented by a device with one or more computers with memory, one or more processors, a light detection circuit, a high pass filter, and a transmitter comprising:
receiving a light signal by the light detection circuit;
the light detection circuit passing the light signal to a filter, the filter producing a series of spikes of at least a threshold intensity when the light signal is of sufficient intensity, the spikes a multiple of a base time apart;

reading a message upon a receipt of one of the series of spikes; and wherein the message is encoded in modified morse code; wherein a DOT is a signal of one time duration, a DASH is a signal of 3 time durations, an END OF LETTER is a signal of 5 time durations; and an END OF WORD is a signal of 9 time durations.

17. The method of claim 16, wherein the message comprises a message portion and an authentication portion.

18. The method of claim 16, further comprising:

detecting a spike;

measuring a delay length between a single spike and a subsequent spike;

when the spike is detected, incrementing a spike counter;

when the delay length exceeds the END OF WORD, clearing the spike counter, and when the spike counter reaches a wakeup threshold then interpreting subsequent spike-delay lengths as a transmitted message.

19. The method of claim 18, wherein the transmitted message is two letters in modified morse code and a third authentication letter in modified morse code.

20. The method of claim 18, wherein a high-pass filter is applied to the spike.

* * * * *